March 31, 1953 K. L. TREIBER 2,633,172
FLEXIBLE CONTAINER
Filed Nov. 1, 1948 4 Sheets-Sheet 1
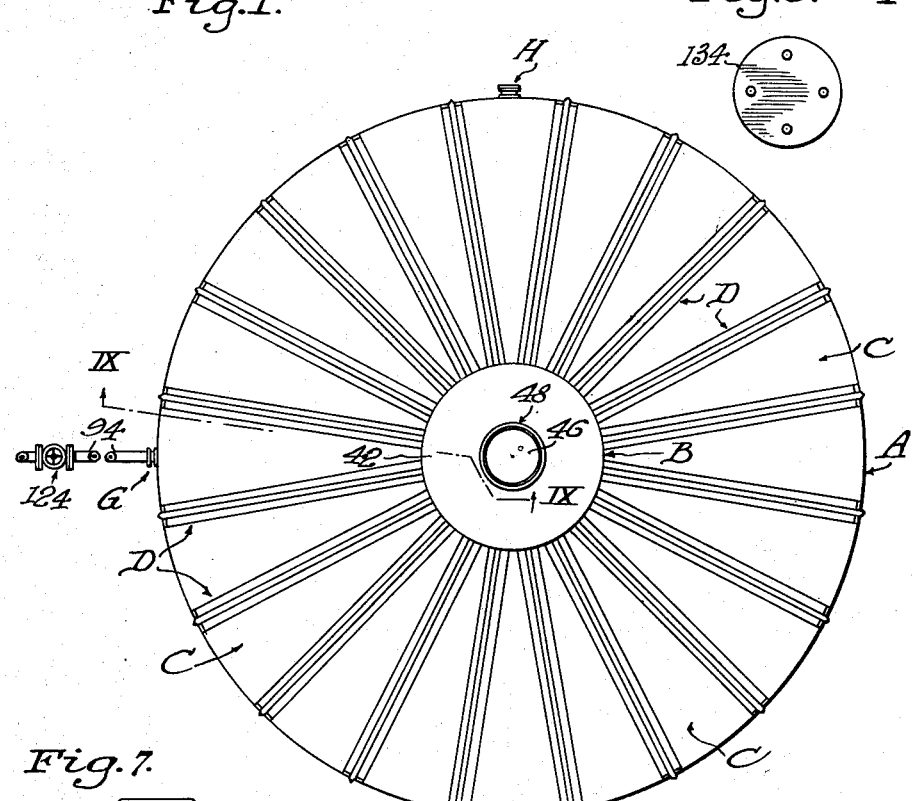
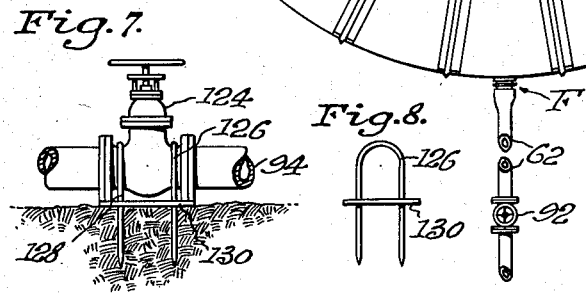
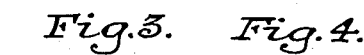
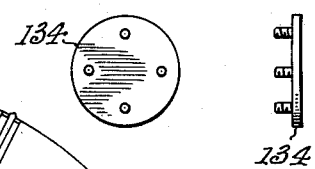
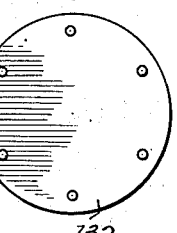
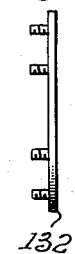
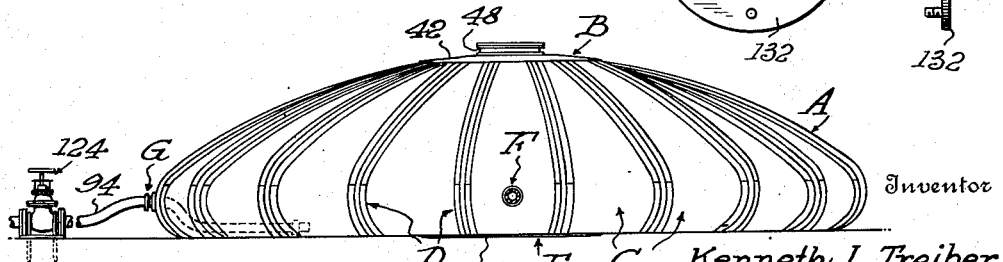
Inventor
Kenneth L. Treiber
By George W. Gardes.
John H. Bruce
Attorneys

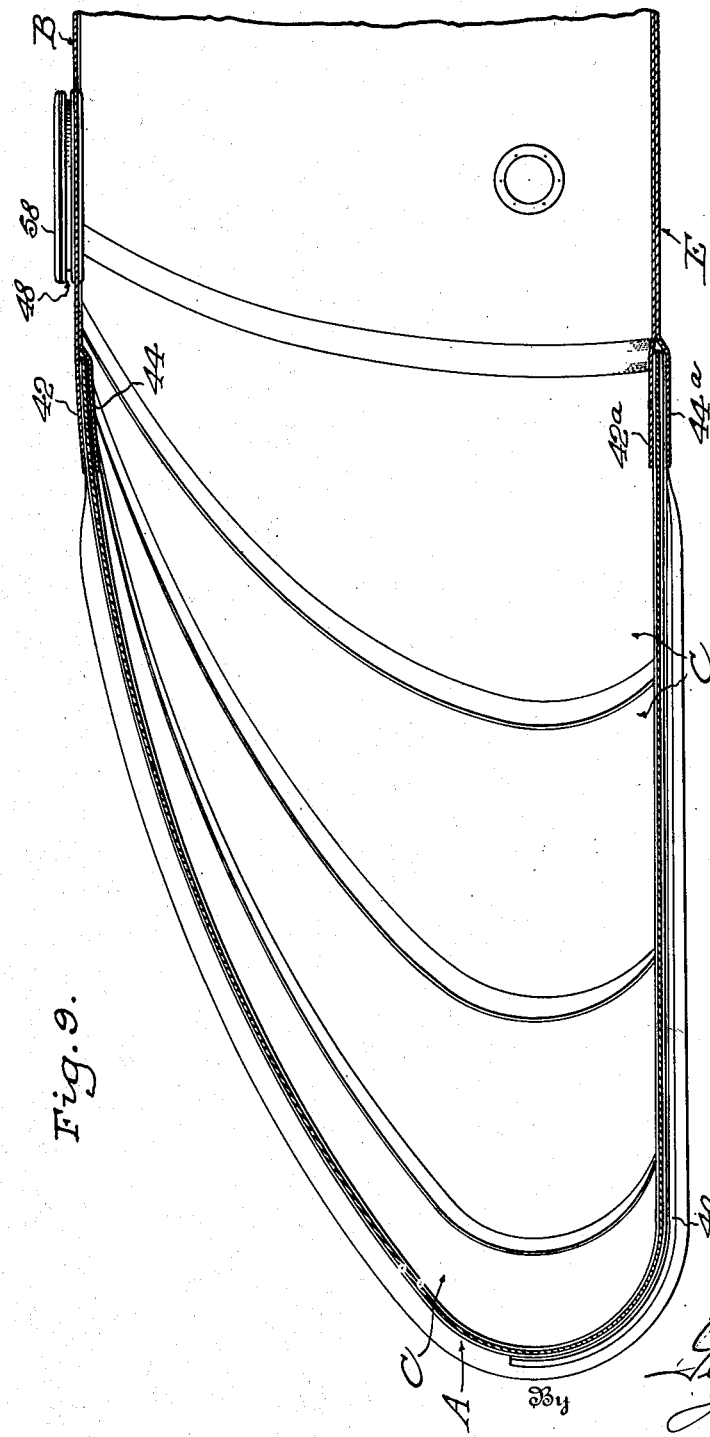
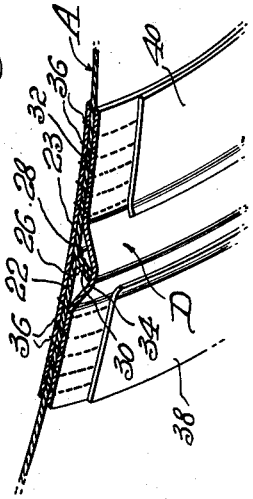

March 31, 1953 K. L. TREIBER 2,633,172
FLEXIBLE CONTAINER
Filed Nov. 1, 1948 4 Sheets-Sheet 3

Inventor
Kenneth L. Treiber
George W. Gardes
By
Attorneys

March 31, 1953 K. L. TREIBER 2,633,172
FLEXIBLE CONTAINER
Filed Nov. 1, 1948 4 Sheets-Sheet 4

Inventor
Kenneth L. Treiber
By George W. Gardes
Attorneys

Patented Mar. 31, 1953

2,633,172

UNITED STATES PATENT OFFICE 2,633,172

FLEXIBLE CONTAINER

Kenneth L. Treiber, Alexandria, Va.

Application November 1, 1948, Serial No. 57,798

3 Claims. (Cl. 150—0.5)

(Granted under Title 35, U. S. Code (1952), sec. 266)

The invention described herein may be manufactured and used by or for the Government for governmental purposes, without payment to me of any royalty thereon.

The present invention relates to storage cells or containers, and more particularly it is directed to a storage tank for liquids such as water, petroleum products, fuels, lubricants and the like, of a collapsible type which is readily portable and which may be assembled readily for field operation. It is well known that such type of a tank or container is an important adjunct to military operations, or for other installations where it is desired to store liquids in receivers more or less temporarily installed in a given location, which receivers can be transported readily to a new location and set up anew.

The use of such type of collapsible and portable storage tanks or containers is not unusual both in military and peacetime installations where storage space is of a temporary or transient character is found to be desirable. The tanks of this type are freely collapsible, enabling ready storage and transport. They are producible in any desired capacity, and when collapsed incident to emptying, they may be folded into compact form and transported readily on a truck to a new location for its reassembly.

From the foregoing, the invention will be seen to have for one of its objects the provision of a collapsible, flexible cell or tank for the storage of water or motor fuel, lubricants, or the like, which can be readily assembled and removed when desired, and which will hold safely a relatively large volume of the contained liquid, and which is adapted to follow the normal configuration taken by the confined liquid.

A further object of the invention is to provide a closed flexible container for storing liquids, which container is provided with a storage safety valve or relief valve in its construction.

A still further object of the invention is to provide a storage cell or reservoir construction in the form of a general circular horizontal cross-section, which is made of any suitable liquid-impervious flexible material, and which is adapted to exert substantially uniform pressure on contained liquids, while being sufficiently rugged in construction so that it will retain the confined liquid while automatically adjusting its shape and hence its capacity to whatever volume of liquid is retained within it.

A still further object of the invention is to provide a storage cell for liquids which will be of substantial capacity and which may be set up rapidly under emergency field conditions and readily filled with the liquid to be retained, but which requires no added supporting structures of any kind.

Further objects and advantages of the construction of the present invention will become apparent as the description proceeds, and the features of novelty will be pointed out in particularity in the appended claims.

It will be understandable readily that for various purposes in addition to military operations and installations, it is highly desirable to have available readily portable storage cells or tanks for various materials, such as motor fuels, lubricants, and the like, which combine ready portability with substantial storage capacity; and the advantages of such equipment become enhanced by combining large liquid storage capacity with easy manipulation in assembling and disassembling and the occupation of minimum storage space when not in use or for storage.

The invention will be understood more readily by reference to the accompanying drawings, in which:

Fig. 1 is a top view of a collapsible storage tank embracing the advantages of the present invention;

Fig. 2 is a side elevation thereof, resting upon the ground in operative position;

Fig. 3 is a plan view of a plate or cover employed in assembling the storage tank or cell of the present invention;

Fig. 4 is a side elevation thereof;

Fig. 5 is a plan view of a further cover plate employed in assembling the construction of the present invention;

Fig. 6 is a side elevation of the element of Fig. 5;

Fig. 7 is a side elevation of a valve assembly employed in connection with the present invention;

Fig. 8 is a front elevation of a wicket member employed in securing the valve assembly of Fig. 7 in position;

Fig. 9 is a fragmentary sectional elevation of the storage cell of Fig. 1 taken on the line IX—IX of Fig. 1, looking in the direction of the arrows;

Fig. 10 is an enlarged detailed view of a fragment of the envelope, showing the manner in which the parts are secured together;

Figure 11:
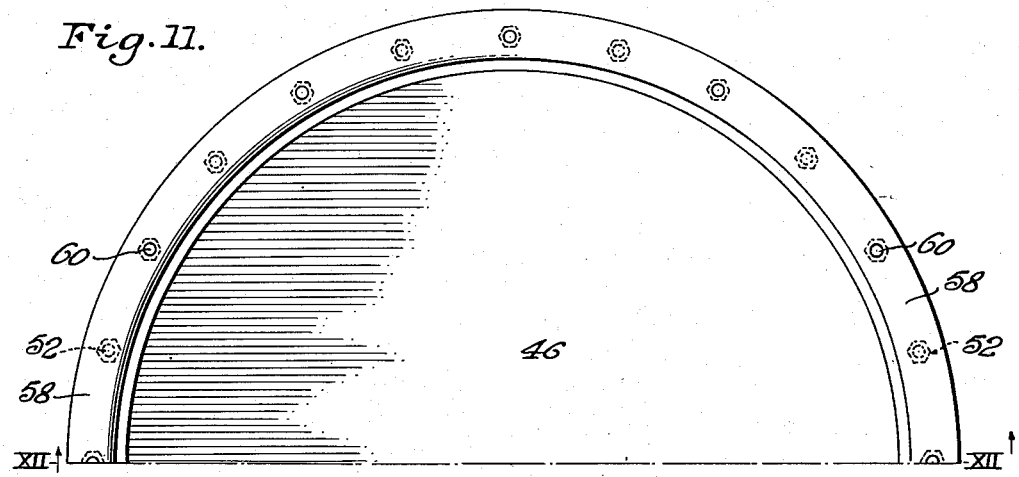
Fig. 11 is a half plan view of one-half of a manhole ring installed at the top of the container.

Referring more particularly to the drawings, the improved storage tank of the present invention is composed of a fabric envelope or container A provided with a top plate B, the container A being formed with a plurality of sections C joined together by rib seams D, which will be referred to in greater particularity hereinafter. The container A is composed of a fabric assembly which is collapsible and foldable into a small and compact space for storage and transport, but which has a substantial capacity and which is self-supporting when containing liquid to be stored, so that no extraneous supporting construction is required. The container A is substantially circular in any horizontal cross section, and is adapted to rest either on the ground or on any prepared surface when in service. A bottom plate E generally similar to the top plate B is provided upon which the container A can rest, this bottom plate forming a portion of the container envelope A. The details of the above-indicated structure will be pointed out in particularity in the following description; and as illustrated in the drawings, the tank envelope A is provided with pipe coupling means F, G, and H for facilitating attachment of pipes for filling the tank A with liquid, or draining stored liquid from the tank, or for drainage from the tank of any accumulated water that may have found its way in devious means into the interior of the tank and forms a bottom liquid layer beneath a body of motor fuel where the tank is used as storage for motor fuels or the like.

In addition to the foregoing features, the present improved construction employs certain features of safety means by which any abnormal condition in the tank can be detected visually and remedied accordingly.

A detailed description of the construction of the envelope A now will be given.

As has been indicated above, the envelope A is composed of a body of collapsible material which conveniently is a fabric that has been treated if necessary to make the same proof against leakage of the liquid stored therein. This envelope A is composed of a series of segments or sections C that are defined by the seams D which pass from the top to the bottom of the tank that is ready for service. For forming the seams D, adjacent edges of the envelope A, designated 22 and 23 are turned together to form abutting flanges 26, 28 and secured together by stitching 30. Behind the flanges there is disposed a layer of fabric 32 of substantial length, which layer is laid flatly against the fabric body A of the tank; and the flanges 26, 28 are overlaid with a further layer of fabric 34 which covers the flanges 26, 28 and which extends for a substantial distance on both sides of the fabric seam. The fabric layers 32 and 34 are secured together by stitching 36 which passes through the fabric layers and through the layer A of the tank envelope, thus holding the parts securely together, and since the respective fabric layers are suitably rendered impervious to the liquid to be stored in the tank, mechanical loss of such liquid through leakage between the contiguous edges of the fabric envelope A of the tank, is prevented in an efficient manner, while the seams themselves, which may extend outwardly from the tank, are protected against damage or possibility thereof by the overlying fabric layer 34 which forms a protective covering for the seams, which are sealed effectively against damage and leakage through the provision of the additional sealing layers 32 and 34. For still further reenforcement and protection, there may be provided, adjacent to the bottom of the tank, gummed strips 38 and 40 which are disposed so as to cover the stitching 36 and the angles formed by the covering layer 34 passing over the seams D, these gummed strips extending for a suitable distance above the bottom of the tank, for example, about two feet above the ground line. The various layers stiffen and reinforce the seams D as well as affording protection therefor, and facilitate the maintenance of the tank in suitable shape for enabling ready filling and dispensing of the liquid relative to the tank, and to make the tank sufficiently stiff along its seams to be self-sustaining when containing liquid. This self-sustaining feature eliminates all need for the provision of any extraneous supporting structure for the tank, the tank being sufficiently flexible, however, so that its contour will follow roughly the liquid level in the tank during both filling of liquid into the tank and the discharge of the liquid therefrom, the tank expanding during filling, and collapsing during discharge of liquid therefrom until the collapsing is balanced by the pressure of accumulated vapors above the liquid in the space formerly occupied by the liquid.

Figure 12:
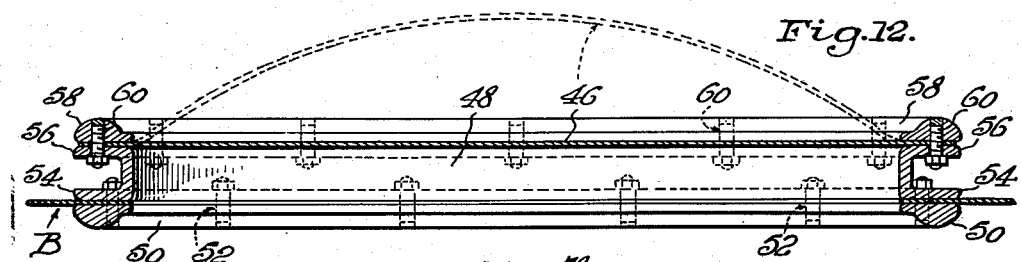
Fig. 12 is a sectional elevation of the half-ring of Fig. 11, the view being taken along the line XII—XII of Fig. 11.
Figure 14:
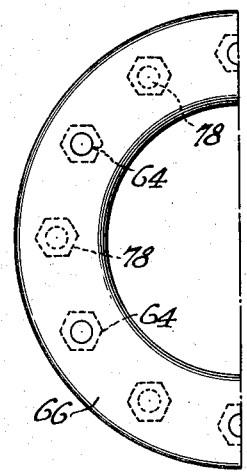
Fig. 14 is a plan view of one-half of the end ring on the coupling assembly of Fig. 13.

As has been mentioned above, the tank is provided with a top plate B and a bottom plate E. The plates are composed preferably of the same fabric as the container, and preferably are formed of two layers 42 and 44 for the top plate B and 42a and 44a for the bottom plate E. These layers are separated peripherally for receiving and clamping the layers of the fabric assembly of the tank, as described above, as will be seen more particularly from Fig. 9. The top plate B may be provided with an opening adapted to serve as a manhole, that normally is closed by a flexible diaphragm 46, of rubber-like material which may be either natural or synthetic in origin and which is inert to the contents of the tank, or rubber itself, that is held between a manhole ring 48, Figs. 11 and 12, that is channel-shaped for bolting a lower retaining ring 50 thereto, the bolts 52 passing through the lower flange 54 of the channel, the plate B and the lower retaining ring 50, the plate B being thus clamped between the channel ring 48 and the lower ring 50, the flexible diaphragm 46 being held in similar manner between the upper flange 56 of the channel ring 48, and the top ring 58, bolts 60 serving as the attaching means. These bolts 60 clamp the periphery of the diaphragm 46, which diaphragm will bulge and in extreme cases will break under pressure of vapors in the tank A, the amount of deformation of this diaphragm being a visual indication of the pressure of the vapors in the tank. The channel member or ring 48 and the top and bottom ring members 58 and 50 are composed of light metal such as aluminum, or the aluminum-magnesium alloy known to the trade as "magnalium," for example. Thus, the amount of deformation of the flexible diaphragm 46 gives a continuous visual indication of the pressures of the vapors in the tank above the liquid level, the amount of deformation increasing or receding responsively to changes in pressure conditions within the tank. As has been indicated above, in extreme cases where the pressure exerted by such vapors exceeds the breaking strength of the material of the diaphragm, the diaphragm will rupture. Therefore, the diaphragm 46 serves as a safety valve, and in view of the potential breaking of the diaphragm under accumulated vapor pressures in the tank, the thickness and material of the diaphragm should be selected so that, should such breakage occur, it will take place before there is any likelihood or danger of the pressures in the tank straining either the seams between the segments of the tank or the interstices of the fabric of the tank to a point where leakage of the liquid contents of the tank would occur.

Figure 13:
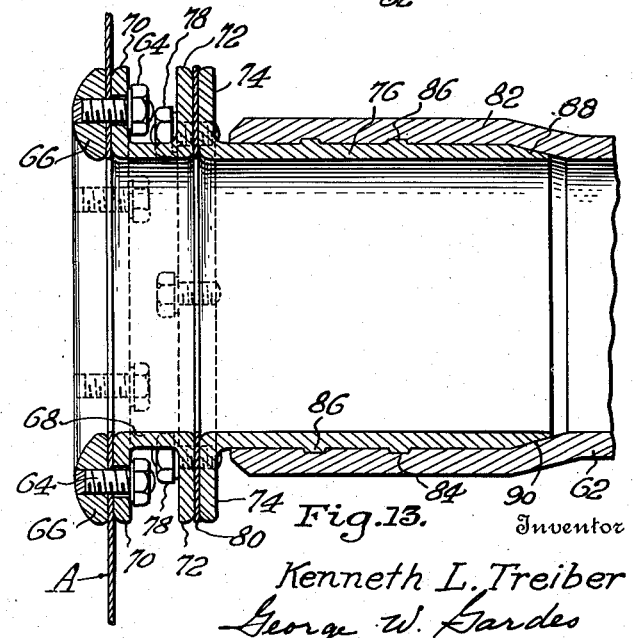
Fig. 13 is a longitudinal sectional elevation of a hose coupling employed for attachment of a hose to be used in filling the storage cell.
Figure 15:
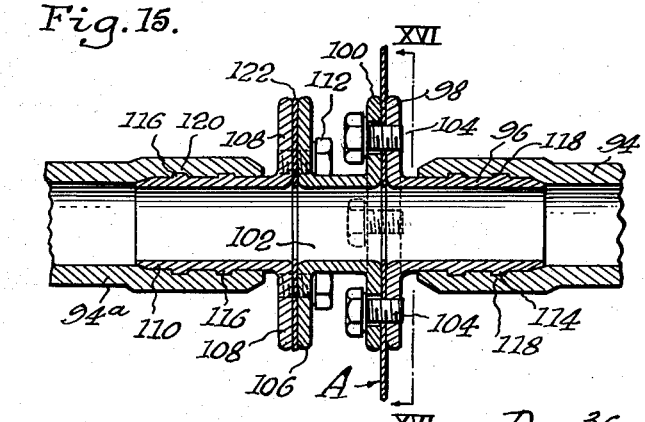
Fig. 15 is a longitudinal sectional elevation of a coupling assembly employed in draining the contents of the storage tank or cell therefrom.
Figure 16:
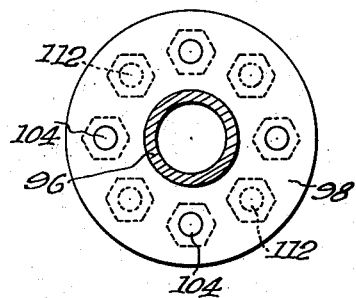
Fig. 16 is a transverse sectional elevation taken on the line XVI—XVI of Fig. 15, looking in the direction of the arrows.
Figure 17:
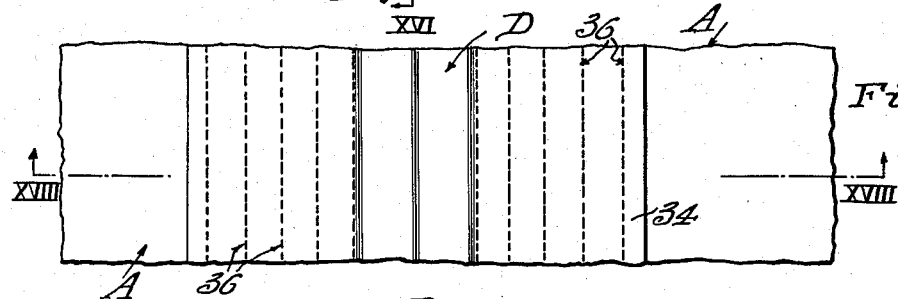
Fig. 17 is a fragmentary plan view of the fabric of the container across one of the segmental ribs toward the top of the tank.
Figure 18:
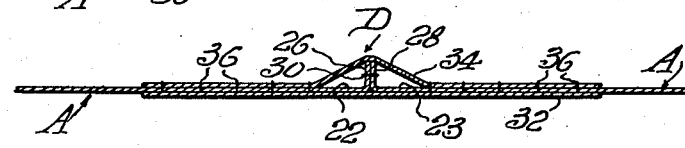
Fig. 18 is a longitudinal sectional elevation taken on the line XVIII—XVIII of Fig. 17.
Figure 19:
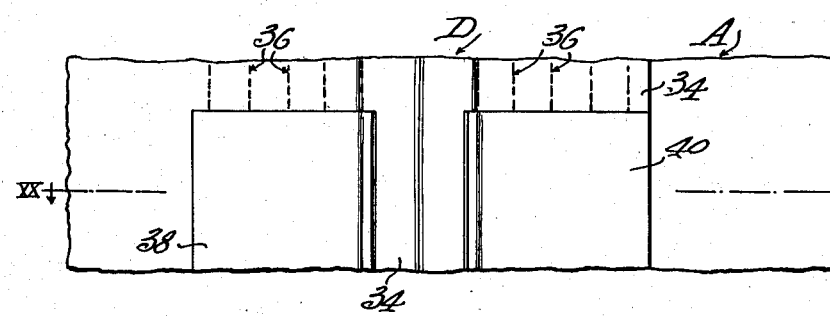
Fig. 19 is a view similar to Fig. 17 taken adjacent to the bottom of the tank as viewed in Fig. 2.
Figure 20:
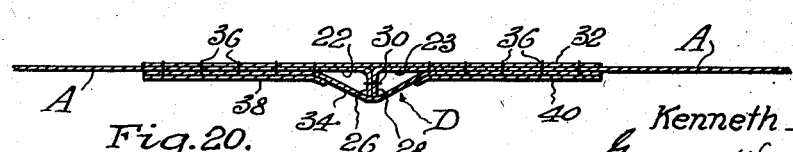
Fig. 20 is a sectional elevation on the line XX—XX of Fig. 19.

It has been mentioned above that the tank A is provided with a plurality of pipe fitting, or couplings. Thus, there is provided an intake pipe coupling F, to which a liquid intake pipe 62 is attached. While the intake pipe or hose 62 and coupling F therefore may be varied widely in construction, a suitable form is shown in detail in Fig. 13. The fitting F is secured to the fabric of the container by bolts or the like 64, the fitting itself being composed of a ring 66 which clamps the container fabric between itself and channel ring 68, the bolts 64 passing through flange 70 of channel ring 68 and into ring 66, a flange 72 of the channel ring 68 connecting with flange 74 of threaded coupling 76 by bolts 78, a gasket 80 being interposed between the flanges 72 and 74 to assure a liquid-tight fit therebetween. The coupling 76 receives sleeve 82 of the hose 62, the sleeve 82 being threaded internally as indicated at 84 for registering with the external threads 86 on the coupling 76. The end of the fitting 76 is tapered inwardly as indicated at 88 which fits against a complementary portion 90 in sleeve 82, adjacent to the hose 62. The supply hose 62 is provided with a control valve 92 for controlling the flow of liquid into the tank A.

The tank A also may be provided with a drainage pipe 94 attached to fitting G, this pipe 94 serving to drain from the tank any water contained therein, which may have been mechanically included in the liquid fuel introduced into the tank, or which may have come from any other source. This drainage pipe 94 extends for a substantial distance into the tank.

The drainage pipe 94 may be attached suitably to a nipple 96 provided with a flange 98 which is secured to a flange 100 of a channel fitting 102, the flanges 98 and 100 being secured together by bolts 104, and retaining between them the fabric of the tank. A second flange, designated at 106 on fitting 102 is bolted to flange 108 of a second nipple 110 by bolts 112. Both nipples 96 and 110 are threaded externally as indicated at 114 and 116 the threads 114 engaging internal threads 118 of pipe section 94 and threads 116 engaging internal threads 120 of pipe section 94a that fits over nipple 110. A sealing gasket 122 is inserted between flanges 106 and 108.

A control valve 124 may be inserted in the drainage pipe. This valve may be of any conventional type adapted to open and close the drainage pipe. It may be desirable, however, to anchor the valve to the ground or other mounting surface, and when found to be so desirable, the anchoring wickets 126, 128 may be employed, the valve being maintained above the ground line by the provision of a wooden ground plate 130 through which the anchoring wickets 126, 128 are driven.

When the tank is not in service, the top manhole beneath the diaphragm 46 is covered by a cover plate 132 by removing ring 58 and replacing the ring with the plate 132; and the rings 66 and 108 of the pipes F and G are removed, and replaced by similar cover plates 134.

While the present invention is herein described and illustrated in a preferred form, it will be apparent that the structural details thereof may be varied considerably without departing from the inventive concept; and accordingly, it will be understood that it is intended and desired to embrace within the scope of this invention such modifications and changes as may be necessary to adapt it to varying conditions and uses, as defined in the appended claims.

Having thus described my invention, what I claim as new and wish to secure by Letters Patent is:

1. A flexible container for bulk storage of liquids comprising a substantially circular base section, a substantially circular top section, a flexible fabric main body mounted thereon interconnecting the said base section and said top section, the said fabric main body being of a single cell construction throughout, the said fabric main body comprising a plurality of panels extending between the top and base sections, liquid-impervious seam means longitudinally interconnecting said panels, said seam means comprising a stitched fold with the panel edges extending outwardly from the main body, an inner closing panel secured to the inner surface of the fabric main body inwardly covering the said seam means, an outer closing panel arcuately covering the outwardly-turned panel edges of said seam means and secured to the outside of the said fabric main body, and a plurality of parallel rows of stitching disposed on both sides of the said outwardly turned panel edges and passing through the interconnecting the said inner and outer panels and the fabric main body panels in liquid-tight relation.

2. A flexible container for bulk storage of liquids comprising a base section, a top section, a fabric main body mounted thereon interconnecting the said base section and said top section, the said fabric main body comprising a plurality of panels extending between the top and base sections, liquid-impervious seam means longitudinally interconnecting said panels, said seam means comprising a stitched fold with the panel edges extending outwardly from the main body, an inner closing panel secured to the inner surface of the fabric main body inwardly covering the said seam means, an outer closing panel arcuately covering the outwardly-turned panel edges of said seam means and secured to the outside of the said fabric main body, and a plurality of parallel rows of stitching disposed on both sides of the said outwardly turned panel edges and passing through and interconnecting the said inner and outer panels and the fabric main body panels in liquid-tight relation.

3. A flexible container for bulk storage of liquids, which comprises, in combination, a substantially circular base section, a substantially circular top section, a flexible fabric main body mounted on the base section interconnecting the said base section and the top section and being of a single cell construction throughout, the fabric body comprising a plurality of panels extending between the top section and the base section, liquid-impervious seam means interconnecting the panels, the seam means comprising a stitched fold with the edges of the panels extending outwardly from the main body, an inner closing panel secured to the inner surface of the fabric main body inwardly covering the said seam means, an outer closing panel arcuately covering the outwardly-turned panel edges of the seam means and secured to the outside of the said fabric main body, and a plurality of parallel rows of stitching disposed on both sides of the outwardly turned panel edges and passing through and interconnecting the inner and outer panels and the fabric main body panels in liquid-tight relation, the said panels and tops and bottom sections being so arranged as to provide a flat mass when the container is empty and gradually increasing as the container is filled, the container when filled having a configuration such that liquid pressures in the container are optimumly distributed for the material and the volume of the container is the maximum possible for the amount of the material employed in the container.

KENNETH L. TREIBER.

REFERENCES CITED

The following references are of record in the file of this patent:

UNITED STATES PATENTS

| Number | Name | Date |
|---|---|---|
| 2,261,035 | Miller | Oct. 28, 1941 |
| 2,313,997 | Jackson | Mar. 16, 1943 |
| 2,326,263 | Steiner | Aug. 10, 1943 |
| 2,355,084 | Kurrle | Aug. 8, 1944 |
| 2,370,799 | Kelley | Mar. 6, 1945 |
| 2,378,128 | Cates | June 16, 1945 |
| 2,440,462 | Cooper | Apr. 27, 1948 |
| 2,457,066 | Pepersack | Dec. 21, 1948 |